United States Patent
Ayyapureddi

(10) Patent No.: US 12,524,306 B2
(45) Date of Patent: Jan. 13, 2026

(54) APPARATUSES, SYSTEMS, AND METHODS FOR PER ROW ERROR SCRUB INFORMATION

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/625,539

(22) Filed: Apr. 3, 2024

(65) Prior Publication Data
US 2024/0248796 A1 Jul. 25, 2024

Related U.S. Application Data

(63) Continuation of application No. 17/730,381, filed on Apr. 27, 2022, now Pat. No. 12,019,513.

(51) Int. Cl.
*G06F 11/00* (2006.01)
*G06F 11/10* (2006.01)

(52) U.S. Cl.
CPC ................. *G06F 11/106* (2013.01)

(58) Field of Classification Search
CPC .. G06F 11/106; G06F 11/0727; G06F 11/073; G06F 11/1048; G06F 11/10
See application file for complete search history.

(56) References Cited

U.S. PATENT DOCUMENTS

| | | |
|---|---|---|
| 5,434,814 A | 7/1995 | Cho et al. |
| 6,249,476 B1 | 6/2001 | Yamazaki et al. |
| 7,117,421 B1 | 10/2006 | Danilak |
| 9,158,617 B2 | 10/2015 | Cho et al. |
| 9,201,728 B2 | 12/2015 | Patapoutian et al. |
| 9,361,960 B2 | 6/2016 | Vogelsang |
| 9,547,550 B1 | 1/2017 | Thakore et al. |
| 9,607,679 B1 | 3/2017 | Kim et al. |
| 9,666,291 B2 | 5/2017 | Park |
| 9,880,901 B2 | 1/2018 | Zastrow |
| 9,996,799 B2 | 6/2018 | Bostick et al. |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

U.S. Appl. No. 18/734,189, titled "Apparatuses, Systems, and Methods for Managing Metadata Storage at a Memory" filed Jun. 5, 2024, pp. all pages of application as filed.

(Continued)

*Primary Examiner* — Joseph D Manoskey
(74) *Attorney, Agent, or Firm* — Dorsey & Whitney LLP

(57) ABSTRACT

Apparatuses, systems, and methods for per row error correct and scrub (pRECS) information. There may be pRECS information associated with each row, and it may reflect a number of codewords stored along that row which were determined to include an error during error correct and scrub (ECS) operations. The memory may store the pRECS information in the memory array, for example, each row may store the pRECS information associated with that row.

20 Claims, 4 Drawing Sheets

(56) References Cited

U.S. PATENT DOCUMENTS

| | | |
|---|---|---|
| 10,127,101 B2 | 11/2018 | Halbert et al. |
| 10,222,989 B1 | 3/2019 | Zitlaw |
| 10,243,590 B1 | 3/2019 | Seshadri |
| 10,810,079 B2 | 10/2020 | Halbert et al. |
| 10,817,371 B2 | 10/2020 | Rooney et al. |
| 10,872,011 B2 | 12/2020 | Bains et al. |
| 10,929,033 B2 | 2/2021 | Meeker et al. |
| 10,937,517 B1 | 3/2021 | Rich-Plotkin et al. |
| 11,010,304 B2 | 5/2021 | Kang et al. |
| 11,074,126 B2 | 7/2021 | Prather et al. |
| 11,088,710 B2 | 8/2021 | Lee et al. |
| 11,200,961 B1 | 12/2021 | Uribe |
| 11,264,085 B1 | 3/2022 | Ware et al. |
| 11,538,515 B2 | 12/2022 | Ji et al. |
| 11,579,971 B2 | 2/2023 | Ayyapureddi |
| 11,580,038 B2 | 2/2023 | Norman et al. |
| 11,615,861 B2 | 3/2023 | Kim et al. |
| 12,001,707 B2 | 6/2024 | Boehm et al. |
| 12,014,797 B2 | 6/2024 | Ayyapureddi |
| 12,019,513 B2 | 6/2024 | Ayyapureddi |
| 12,204,410 B2 | 1/2025 | Sutera et al. |
| 12,204,770 B2 | 1/2025 | Ayyapureddi |
| 12,230,347 B2 | 2/2025 | Suh et al. |
| 12,249,393 B2 | 3/2025 | Reohr |
| 2003/0081492 A1 | 5/2003 | Farrell et al. |
| 2006/0233030 A1 | 10/2006 | Choi |
| 2008/0089129 A1 | 4/2008 | Lee |
| 2008/0313493 A1 | 12/2008 | Roohparvar et al. |
| 2009/0097348 A1 | 4/2009 | Minzoni et al. |
| 2009/0132876 A1 | 5/2009 | Freking et al. |
| 2009/0168523 A1 | 7/2009 | Shirakawa et al. |
| 2009/0196103 A1 | 8/2009 | Kim et al. |
| 2010/0177582 A1 | 7/2010 | Kim et al. |
| 2010/0177587 A1 | 7/2010 | Huang |
| 2010/0290146 A1 | 11/2010 | Lam |
| 2011/0154158 A1 | 6/2011 | Yurzola et al. |
| 2013/0117630 A1 | 5/2013 | Kang |
| 2014/0126300 A1 | 5/2014 | Takahashi et al. |
| 2015/0193464 A1 | 7/2015 | Kwon et al. |
| 2015/0262631 A1 | 9/2015 | Shimizu |
| 2016/0070507 A1 | 3/2016 | Hoshikawa et al. |
| 2016/0092307 A1 | 3/2016 | Bonen et al. |
| 2016/0125920 A1 | 5/2016 | Kim et al. |
| 2016/0307645 A1 | 10/2016 | Kim et al. |
| 2017/0060681 A1* | 3/2017 | Halbert ............... G06F 11/1048 |
| 2017/0062067 A1 | 3/2017 | Yang et al. |
| 2017/0091025 A1 | 3/2017 | Ahn et al. |
| 2017/0192843 A1* | 7/2017 | Warnes ................. G11C 29/06 |
| 2017/0249097 A1 | 8/2017 | Eguchi |
| 2017/0269992 A1 | 9/2017 | Bandic et al. |
| 2017/0285990 A1 | 10/2017 | Chen et al. |
| 2017/0286213 A1 | 10/2017 | Li |
| 2017/0344423 A1 | 11/2017 | Hsiao et al. |
| 2018/0025760 A1 | 1/2018 | Mazumder et al. |
| 2018/0121283 A1 | 5/2018 | Plants |
| 2018/0150350 A1* | 5/2018 | Cha ..................... G06F 11/1016 |
| 2019/0066816 A1 | 2/2019 | Dono |
| 2019/0073261 A1 | 3/2019 | Halbert et al. |
| 2019/0103154 A1 | 4/2019 | Cox et al. |
| 2019/0197171 A1 | 6/2019 | Tiwari et al. |
| 2019/0206478 A1 | 7/2019 | Jun |
| 2019/0362792 A1 | 11/2019 | Oh et al. |
| 2019/0369893 A1 | 12/2019 | Ross |
| 2020/0019462 A1 | 1/2020 | Prather et al. |
| 2020/0051616 A1 | 2/2020 | Cho |
| 2020/0104205 A1 | 4/2020 | Noguchi et al. |
| 2020/0104208 A1 | 4/2020 | Heo et al. |
| 2020/0194050 A1 | 6/2020 | Akamatsu |
| 2020/0226039 A1 | 7/2020 | Lee |
| 2020/0373941 A1 | 11/2020 | Latorre et al. |
| 2021/0011645 A1 | 1/2021 | Martinelli et al. |
| 2021/0012817 A1 | 1/2021 | Laurent et al. |
| 2021/0012849 A1 | 1/2021 | Kim et al. |
| 2021/0057003 A1 | 2/2021 | Prather et al. |
| 2021/0064119 A1 | 3/2021 | Mirichigni et al. |
| 2021/0064282 A1 | 3/2021 | He et al. |
| 2021/0064461 A1 | 3/2021 | Veches |
| 2021/0064467 A1 | 3/2021 | Buerkle et al. |
| 2021/0083687 A1 | 3/2021 | Lee et al. |
| 2021/0142848 A1* | 5/2021 | Lim ....................... G11C 29/81 |
| 2021/0142860 A1 | 5/2021 | Song et al. |
| 2021/0200630 A1 | 7/2021 | Ishikawa et al. |
| 2021/0208967 A1 | 7/2021 | Cha et al. |
| 2021/0224155 A1 | 7/2021 | Bains et al. |
| 2021/0247910 A1 | 8/2021 | Kim et al. |
| 2021/0272627 A1 | 9/2021 | Lee |
| 2021/0294692 A1 | 9/2021 | Chen |
| 2021/0311821 A1 | 10/2021 | Ryu et al. |
| 2021/0311822 A1 | 10/2021 | Jannusch et al. |
| 2021/0311830 A1 | 10/2021 | Lee |
| 2021/0357287 A1 | 11/2021 | Kim et al. |
| 2021/0358559 A1 | 11/2021 | Suh et al. |
| 2021/0365316 A1* | 11/2021 | Nale ................... G06F 11/1048 |
| 2021/0406123 A1 | 12/2021 | Nakanishi et al. |
| 2022/0027090 A1 | 1/2022 | Kwon et al. |
| 2022/0035529 A1 | 2/2022 | Bennett |
| 2022/0084565 A1 | 3/2022 | Prather et al. |
| 2022/0091938 A1 | 3/2022 | Buerkle et al. |
| 2022/0129196 A1 | 4/2022 | Roberts et al. |
| 2022/0138065 A1 | 5/2022 | Secatch et al. |
| 2022/0197739 A1 | 6/2022 | Ryu et al. |
| 2022/0261310 A1 | 8/2022 | Ishikawa et al. |
| 2022/0334917 A1 | 10/2022 | Veches |
| 2022/0337271 A1 | 10/2022 | Hanna |
| 2022/0365692 A1 | 11/2022 | Vankamamidi et al. |
| 2022/0398042 A1 | 12/2022 | Song et al. |
| 2022/0415398 A1 | 12/2022 | Lien et al. |
| 2023/0146549 A1 | 5/2023 | Lien et al. |
| 2023/0161665 A1 | 5/2023 | Choi et al. |
| 2023/0185665 A1 | 6/2023 | Ayyapureddi |
| 2023/0223096 A1 | 7/2023 | Bains et al. |
| 2023/0289072 A1 | 9/2023 | Cho et al. |
| 2023/0298682 A1 | 9/2023 | Suh et al. |
| 2023/0350581 A1 | 11/2023 | Ayyapureddi |
| 2023/0350748 A1 | 11/2023 | Ayyapureddi |
| 2023/0352064 A1 | 11/2023 | Ayyapureddi |
| 2023/0352112 A1 | 11/2023 | Ayyapureddi |
| 2024/0079074 A1 | 3/2024 | Bak et al. |
| 2024/0086520 A1 | 3/2024 | Kaplan et al. |
| 2024/0096404 A1 | 3/2024 | Cho et al. |
| 2024/0126438 A1 | 4/2024 | Suh et al. |
| 2024/0160351 A1 | 5/2024 | Ayyapureddi et al. |
| 2024/0160524 A1 | 5/2024 | Ayyapureddi et al. |
| 2024/0160527 A1 | 5/2024 | Ayyapureddi et al. |
| 2024/0161855 A1 | 5/2024 | Smith et al. |
| 2024/0161856 A1 | 5/2024 | Smith et al. |
| 2024/0161859 A1 | 5/2024 | Ayyapureddi et al. |
| 2024/0170088 A1 | 5/2024 | Smith et al. |
| 2024/0176699 A1 | 5/2024 | Ayyapureddi et al. |
| 2024/0177794 A1 | 5/2024 | Vogelsang |
| 2024/0220149 A1 | 7/2024 | Kim et al. |
| 2024/0256380 A1 | 8/2024 | Ayyapureddi |
| 2024/0256382 A1 | 8/2024 | Ayyapureddi |
| 2024/0272979 A1 | 8/2024 | Ayyapureddi |
| 2024/0272984 A1 | 8/2024 | Ayyapureddi |
| 2024/0273014 A1 | 8/2024 | Ayyapureddi |
| 2024/0274223 A1 | 8/2024 | Ayyapureddi |
| 2024/0281327 A1 | 8/2024 | Ayyapureddi et al. |
| 2024/0289266 A1 | 8/2024 | Ayyapureddi |
| 2024/0321328 A1 | 9/2024 | Ayyapureddi |
| 2024/0377952 A1 | 11/2024 | Song et al. |
| 2024/0394178 A1 | 11/2024 | Partsch |
| 2024/0419538 A1* | 12/2024 | Huang ................... G11C 29/42 |
| 2025/0077103 A1 | 3/2025 | Ayyapureddi |
| 2025/0077424 A1 | 3/2025 | Ayyapureddi |
| 2025/0078906 A1 | 3/2025 | Kim et al. |
| 2025/0078949 A1 | 3/2025 | Ayyapureddi |
| 2025/0078950 A1 | 3/2025 | Ayyapureddi |
| 2025/0110643 A1 | 4/2025 | Ayyapureddi |
| 2025/0110825 A1 | 4/2025 | Ayyapureddi |
| 2025/0110830 A1 | 4/2025 | Ayyapureddi |
| 2025/0111887 A1 | 4/2025 | Ayyapureddi |
| 2025/0112643 A1 | 4/2025 | Ayyapureddi |

(56) References Cited

U.S. PATENT DOCUMENTS

| | | |
|---|---|---|
| 2025/0123924 A1 | 4/2025 | Ayyapureddi et al. |
| 2025/0138940 A1 | 5/2025 | Cho et al. |
| 2025/0156087 A1 | 5/2025 | Ayyapureddi |

FOREIGN PATENT DOCUMENTS

| | | |
|---|---|---|
| WO | 2024107503 A1 | 5/2024 |
| WO | 2024107504 A1 | 5/2024 |
| WO | 2025053912 A1 | 3/2025 |
| WO | 2025075696 A1 | 4/2025 |
| WO | 2025075697 A1 | 4/2025 |

OTHER PUBLICATIONS

"International Search Report and Written Opinion for PCT/US2024/013516, mailed on May 27, 2024", pp. all pages of report.
U.S. Appl. No. 19/025,934, titled "Apparatuses, Systems, and Methods for Managing Metadata Security and Access" filed Jan. 16, 2025, pp. all pages of application as filed.
PCT Application No. PCT/US24/39192 titled "Apparatuses and Methods for Scalable 1-Pass Error Correction Code Operations" filed Jul. 23, 2024, pp. all pages of the application as filed.
PCT Application No. PCT/US24/39195 titled "Apparatuses and Methods for Half-Page Modes of Memory Devices" filed Jul. 23, 2024, pp. all pages of the application as filed.
PCT Application No. PCT/US24/39231 titled "Apparatuses and Methods for Granular Single-Pass Metadata Access Operations" filed Jul. 24, 2024, pp. all pages of the application as filed.
U.S. Appl. No. 18/743,994 titled "Apparatuses and Methods for Shared Codeword in 2-Pass Access Operations" filed Jun. 14, 2024, pp. all pages of the application as filed.
U.S. Appl. No. 18/745,577 titled "Apparatuses and Methods for Half-Page Modes of Memory Devices" filed Jun. 17, 2024, pp. all pages of the application as filed.
U.S. Appl. No. 18/745,843 titled "Apparatuses and Methods for Half-Page Modes of Memory Devices" filed Jun. 17, 2024, pp. all pages of the application as filed.
U.S. Appl. No. 18/745,877 titled "Apparatuses and Methods for Half-Page Modes of Memory Devices" filed Jun. 17, 2024, pp. all pages of the application as filed.
U.S. Appl. No. 18/745,894 titled "Apparatuses and Methods for Half-Page Modes of Memory Devices" filed Jun. 17, 2024, pp. all pages of the application as filed.
U.S. Appl. No. 18/747,658, titled "Apparatuses and Methods for Bounded Fault Compliant Metadata Storage" filed Jun. 19, 2024, pp. all pages of application as filed.
U.S. Appl. No. 18/747,676, titled "Apparatuses and Methods for Alternate Memory Die Metadata Storage", filed Jun. 19, 2024, pp. all pages of application as filed.
U.S. Appl. No. 18/747,696, titled "Apparatuses and Methods for Scalable 1-Pass Error Correction Code Operations", filed Jun. 19, 2024, pp. all pages of application as filed.
U.S. Appl. No. 18/747,712, titled "Apparatuses and Methods for Granular Single-Pass Metadata Access Operations" filed Jun. 19, 2024, pp. all pages of application as filed.
U.S. Appl. No. 18/747,635, titled "Apparatuses and Methods for Read/Modify/Write Single-Pass Metadata Access Operations" filed Jun. 19, 2024, pp. all pages of application as filed.
International Search Report and Written Opinion for PCT/US2023/076430, mailed on Feb. 13, 2024; all pages of report.
International Search Report and Written Opinion for PCT/US2023/076433, mailed on Feb. 5, 2024.
PCT Application No. PCT/US23/76430 titled "Apparatuses and Methods for Separate Write Enable for Single-Pass Access of Data, Metadata, and Parity Information" filed Oct. 10, 2023, pp. all pages of application as filed.
PCT Application No. PCT/US23/76433 titled "Apparatuses and Methods for Single-Pass Access of ECC Information, Metadata Information or Combinations Thereof" filed Oct. 10, 2023; pp. all pages of application as filed.
PCT Application No. PCT/US24/13516, titled "Apparatuses, Systems, and Methods for Storing Memory Metadata" filed Jan. 30, 2024; pp. all pages of application as filed.
U.S. Appl. No. 18/424,282 titled "Apparatuses and Methods for Bounded Fault Compliant Metadata Storage" filed Jan. 26, 2024; pp. all pages of application as filed.
U.S. Appl. No. 18/424,342 titled "Apparatuses and Methods for Bounded Fault Compliant Metadata Storage" filed Jan. 26, 2024; pp. all pages of application as filed.
U.S. Appl. No. 18/430,381, titled "Apparatuses, Systems, and Methods for Storing Memory Metadata", filed Feb. 1, 2024; pp. all pages of application as filed.
U.S. Appl. No. 18/430,406, titled "Apparatuses, Systems, and Methods for Storing Memory Metadata", filed Feb. 1, 2024; pp. all pages of application as filed.
U.S. Appl. No. 18/431,232, titled "Apparatuses, Systems, and Methods for Storing Memory Metadata", filed Feb. 2, 2024; pp. all pages of application as filed.
U.S. Appl. No. 18/431,306, titled "Apparatuses, Systems, and Methods for Storing Memory Metadata", filed Feb. 2, 2024; pp. all pages of application as filed.
U.S. Appl. No. 18/441,775 titled "Apparatuses and Methods for Settings for Adjustable Write Timing" filed Feb. 14, 2024, pp. all pages of the application as filed.
U.S. Appl. No. 18/441,830 titled "Apparatuses, Systems, and Methods for Storing and Accessing Memory Metadata and Error Correction Code Data" filed Feb. 14, 2024, pp. all pages of the application as filed.
U.S. Appl. No. 18/504,215 titled "Apparatuses and Methods for Enhanced Metadata Support" filed Nov. 8, 2023; pp. all pages of application as filed.
U.S. Appl. No. 18/504,234 titled "Apparatuses and Methods for Enhanced Metadata Support" filed Nov. 8, 2023; pp. all pages of application as filed.
U.S. Appl. No. 18/504,302 titled "Apparatuses and Methods for Configurable ECC Modes" filed Nov. 8, 2023; pp. all pages of application as filed.
U.S. Appl. No. 18/504,316 titled "Apparatuses and Methods for Configurable ECC Modes" filed Nov. 8, 2023; all pages of application as filed.
U.S. Appl. No. 18/504,324 titled "Apparatuses and Methods for Single-Pass Access of ECC Information, Metadata Information or Combinations Thereof" filed Nov. 8, 2023, all pages of application as filed.
U.S. Appl. No. 18/504,342 titled "Apparatuses and Methods for Single-Pass Access of ECC Information, Metadata Information or Combinations Thereof" filed Nov. 8, 2023; pp. all pages of application as filed.
U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.
U.S. Appl. No. 18/504,362 titled "Apparatuses and Methods for Separate Write Enable for Single-Pass Access of Data, Metadata, and Parity Information" filed Nov. 8, 2023; pp. all pages of application as filed.
Lumenci Team "High Bandwidth Memory (HBM3)" https://lumenci.com/blogs/high-bandwidth-memory; Editorial Team at Lumenci, Jul. 14, 2022; pp. 1-3.
Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.
J. F. Philippe Marchand "An Alterable Programmable Logic Array"; IEEE Journal of Solid-State Circuits, vol. sc-20, No. 5, Oct. 1985; pp. 1061-1066.
U.S. Appl. No. 19/376,027 titled "Apparatuses and Methods for Single-Pass Access of ECC Information, Metadata Information or Combinations Thereof", filed Oct. 31, 2025; pp. all pages of application as filed.

* cited by examiner under the skill in the art so as not to obscure the description of embodiments of the disclosure. The following detailed description is therefore not to be taken in a limiting sense, and the scope of the disclosure is defined only by the appended claims.

APPARATUSES, SYSTEMS, AND METHODS FOR PER ROW ERROR SCRUB INFORMATION

CROSS REFERENCE TO RELATED APPLICATION(S)

This application is a continuation of U.S. patent application Ser. No. 17/730,381, on Apr. 27, 2022. The aforementioned application is incorporated herein by reference, in its entirety, for any purpose.

BACKGROUND

This disclosure relates generally to semiconductor devices, such as semiconductor memory devices. The semiconductor memory device may include a number of memory cells which are used to store information. The stored information may be encoded as binary data, and each memory cell may store a single bit of the information. Information may decay or change in the memory cells due to a variety of different errors, which may lead to one or more bits of incorrect information (e.g., bits with different states that the bit which was originally written) being read out from the memory device.

There may be many applications where it is useful to ensure a high fidelity of information read out from the memory. Memory devices may include error correction circuits, which may be used to determine if the information read out of the memory cells contains any errors compared to the data written into the memory cells, and may correct discovered errors. The memory device may periodically use the error correction circuits to repair errors in information stored within the memory array by scanning every memory cell of the memory array.

DETAILED DESCRIPTION

Figure 1:
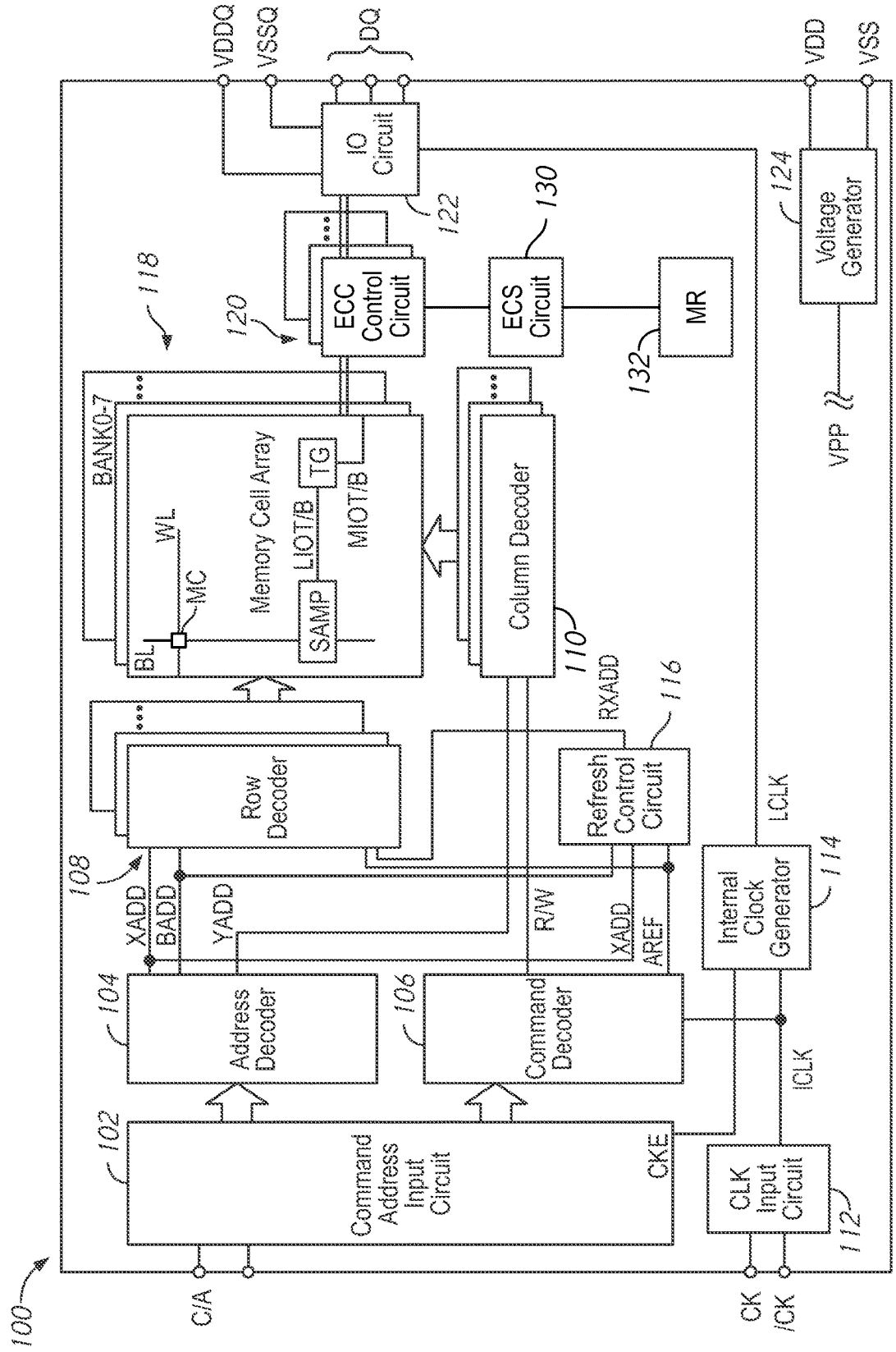
FIG. 1 is a block diagram of a semiconductor device according some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

A memory device may include a memory array which has a number of memory cells, each located at the intersection of a word line (row) and digit line (column). During a read or write operation, a row may be activated, and data may be read from, or written to, the memory cells along the activated row. Each row may include memory cells which store a number of bits of data and a number of bits of parity information (e.g., data bits and parity bits), which may be used to correct up to a certain number of errors in the data bits. For example, a row may include one or more codewords, each of which includes M data bits and K parity bits, which may be used to correct up to one of the M data bits or one of the K parity bits. During a write operation the parity bits may be generated by an error correction code (ECC) circuit based on the data written to the memory cells of the row. During a read operation the error correction code circuit may use the parity bits to determine if the read data bits are correct, and may correct any errors which are found in the data as it is being provided off the memory device.

The ECC circuit may identify errors in read data and correct the read data before it is provided to data terminals of the memory device. However, the error may remain in the codeword stored in the memory array. The device may perform error check and scrub (ECS) operations to remedy this. In an ECS operation, the address of each codeword of the memory array may be accessed one at a time. The codeword from the current address is read out, an error, if present, is corrected by the ECC circuit, and then the corrected codeword is written back to the memory array. The memory performs an ECS cycle by performing ECS operations on each codeword of the memory by working through a sequence of every codeword address.

During an ECS cycle, the memory may collect information about the number of codewords which contained an error. For example, the memory may report a total number of codewords with errors and/or the address of the row which contains the most codeword errors. However, it may be useful to collect more granular information about the detected codeword errors.

The present disclosure is directed to apparatuses, systems, and methods for per row scrub information. The memory may collect per-row ECS (pRECS) information about each row. For example, over the course a scrub cycle, the memory may generate a number for each row, where the number is the number of codewords on that row which were determined to have an error during their respective ECS operation.

The memory may store the pRECS information along each row. For example, the columns along a given row may be specified by a column select signal, with sets of bit lines sharing a common column select signal value. One column select signal may be used to store the per-row scrub information along each row. In some embodiments, the column select signal used to store the per-row scrub information may be associated with 'stranded' memory cells (e.g., memory cells which are not otherwise used as addressable memory). The controller may access the row and read from the bit lines associated with the designated column select signal to retrieve the per-row scrub information.

FIG. 1 is a block diagram of a semiconductor device according an embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL, a plurality of bit lines BL, and a plurality of memory cells MC arranged at intersections of the plurality of word lines WL and the plurality of bit line BL. The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B) which are coupled to an error correction code (ECC) control circuit 120. Conversely, write data outputted from the ECC control circuit 120 is transferred to the sense amplifier SAMP over the complementary main data lines MIOT/B, the transfer gate TG, and the complementary local data lines LIOT/B, and written in the memory cell MC coupled to the bit line BL.

The semiconductor device 100 may employ a plurality of external terminals that include command and address (C/A) terminals coupled to a command and address bus to receive commands and addresses, and a CS signal, clock terminals to receive clocks CK and/CK, data terminals DQ to provide data, and power supply terminals to receive power supply potentials VDD, VSS, VDDQ, and VSSQ.

The clock terminals are supplied with external clocks CK and/CK that are provided to an input circuit 112. The external clocks may be complementary. The input circuit 112 generates an internal clock ICLK based on the CK and/CK clocks. The ICLK clock is provided to the command decoder 106 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a read command. When a read command is received, and a bank address, a row address and a column address are timely supplied with the read command, a codeword including read data and read parity bits is read from memory cells in the memory array 118 corresponding to the row address and column address. The read command is received by the command decoder 106, which provides internal commands so that read data from the memory array 118 is provided to the ECC control circuit 120. The ECC control circuit 120 may use the parity bits in the codeword to determine if the codeword includes any errors, and if any errors are detected, may correct them to generate a corrected codeword (e.g., by changing a state of the identified bit(s) which are in error). The corrected codeword (without the parity bits) is output to outside the device 100 from the data terminals DQ via the input/output circuit 122.

The device 100 may receive an access command which is a write command. When the write command is received, and a bank address, a row address, and a column address are timely supplied as part of the write operation, and write data is supplied through the DQ terminals to the ECC control circuit 120. The write data supplied to the data terminals DQ is written to a memory cells in the memory array 118 corresponding to the row address and column address. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 to the ECC control circuit 120. The ECC control circuit 120 may generate a number of parity bits based on the write data, and the write data and the parity bits may be provided as a codeword to the memory array 118 to be written into the memory cells MC.

The ECC control circuit 120 may be used to ensure the fidelity of the data read from a particular group of memory cells to the data written to that group of memory cells. The device 100 may include a number of different ECC control circuits 120, each of which is responsible for a different portion of the memory cells MC of the memory array 118. For example, there may be one or more ECC control circuits 120 for each bank of the memory array 118.

Each ECC control circuit 120 may receive a codeword which includes a certain number of data bits and a certain number of parity bits (e.g., 128 data bits and 8 parity bits). The data bits may be provided from either from the IO circuit 122 or the memory array 118 depending on if it is a read or write operation, and the ECC control circuit 120 uses the parity bits to locate and correct potential errors in the codeword. For example, as part of a write operation an ECC control circuit 120 may receive 128 bits of data from the TO circuit 122 and may generate 8 parity bits based on those 128 data bits to form a codeword with 136 total bits. The codeword may be written to the memory array 118. As part of an example read operation, the ECC control circuit 120 may receive a codeword with 128 data bits and 8 parity bits from the memory cell array 118. The ECC control circuit 120 may generate new parity bits from the 128 data bits, and then compare the new parity bits to the read parity bits in the codeword to generate syndrome bits. The syndrome bits may be used to locate errors in the codeword and the ECC control circuit 120 and may correct them if any are found before supplying the data bits to the TO circuit 122. While various embodiments may be discussed with reference to ECC circuits which use codewords where 8 parity bits are used to find one error in 128 data bits, it should be understood that these are for explanatory purposes only, and that other numbers of data bits, error bits, and parity bits may be used in other example embodiments.

During a read operation, the ECC control circuit 120 checks the codeword and locates and corrects any errors before providing the corrected codeword to the IO circuit 122. Accordingly, if there was an error, it may remain in the codeword stored in the memory array 118 since the correction is made between the memory array 118 and the IO circuit 122. The memory device 100 includes error check and scrub (ECS) logic 130, which is used to correct errors stored within the memory array 118. Over the course of an ECS cycle, the ECS circuit 130 generates a sequence of addresses (e.g., a sequence of row addresses and a sequence of column addresses), which cover all the codewords stored in the memory array 118. For each address in the sequence, the ECS circuit 130 operates the address decoder 104 and command decoder 106 to perform a read operation on the memory cells of that address, and then instead of providing the corrected codeword off the device 100 as in a normal read, the corrected codeword is written back to the memory array 118. In some embodiments, only a portion of the codeword (e.g., only the data bits or only the data bit changed by the correction) may be written back to overwrite the previous codeword. By cycling through a sequence of addresses which includes all codewords, the ECS circuit 130 may perform an ECS cycle to repair the errors in the memory cells array 118.

The ECS circuit 130 may perform an ECS cycle based on a manual or auto mode. In a manual mode, the ECS circuit 130 may receive a command (e.g., a multi-purpose command or MPC) and may perform an ECS operation responsive to that command. In an auto mode, the ECS circuit 130 may use internal logic and timing to carry out ECS operation. For example, the ECS circuit 130 may perform ECS operations during refresh operations. The ECS circuit 130 may have a specified time over which to complete the sequence of addresses (e.g., to perform the ECS cycle). For example, the memory device 100 may specify 12, 24, or 48 hours to complete a sequence of ECS operations which includes all codewords in the memory array 118. The ECS circuit 130 may perform a read, correct, and write ECS operation on each address in the sequence such that the sequence is completed over the course of the specified period. Accordingly, the average timing between individual ECS operations may be specified by the total number of codewords in the memory array 118 and the length of time in which the ECS cycle should be performed.

The ECS circuit 130 collects information about the errors which are located. The memory 100 may record per-row ECS information when a per-row ECS mode is enabled. The per-row ECS mode may be enabled by a setting in the mode register 132. For example, each row of the memory array 118 may include a number of code words. When the pRECS mode is enabled, the ECS circuit 130 may generate a count for each row which indicates how many codewords on that row included an error during the most recent ECS cycle. For example, the ECS circuit 130 may include a per-row ECS register. During the ECS cycle, the ECS circuit 130 may generate a row address, and then perform an ECS operation on each codeword of that row address (e.g., by generating column addresses in sequence) before moving on to a next row. During that process, if an error is detected and a pRECS mode is enabled, the value in the per-row ECS register may be updated (e.g., incremented). Once all the codewords along the current row are checked (e.g., when the column address wraps back around to an initial value), the value in the per-row ECS register may be stored, and the per-row ECS register reset to an initial value (e.g., 0).

In some embodiments, there may be multiple per-row ECS registers, such as a per-row ECS register for each bank. Multiple pre-row ECS registers may be used because ECS operations may be dispersed between different banks (e.g., an ECS operation in a first bank may be followed by an ECS operation in a second bank before a second ECS operation in the first bank occurs). Accordingly, each per-row ECS register may track a number of errors along a current row for each bank.

In some embodiments, the ECS circuit 130 may store the per-row ECS information on the row associated with that per-row ECS information. For example, a set of memory cells along the row may be set aside to be used as storage for per-row ECS information. In some embodiments, which memory cells are set aside may be a setting of the mode register 132. For example, a column select (CS) signal value may specify the bit lines which intersect the set aside memory cells along each row, and that value of the CS signal may be stored in the mode register 132. Other methods of designating memory cells along the rows to store the pRECS information may be used in other examples. A controller of the memory 100 may use read operations to retrieve the per-row ECS information from one or more rows.

In some embodiments, the memory 100 may also generate overall ECS information such as overall readouts. For example, the ECS circuit 130 may store overall ECS information in a mode register 132, so that a controller of the memory device 100 may retrieve readout information about errors in the memory device 100. For example, the ECS circuit 130 may change (e.g., increment) an error count (EC) count value each time a codeword with an error is detected. In some embodiments, the error count (EC) may be changed responsive to each row which includes one or more codeword errors. Whether the EC value represents total codewords or rows with at least one codeword error may be setting of the memory 100 (e.g., based on a setting in the mode register 132) and may be changed between ECS cycles. When all addresses in the sequence are complete, the ECS circuit 130 may write this count value to the mode register 132. In some embodiments, the ECS circuit 130 may only write the count value to the mode register 132 if the EC count value exceeds a threshold filter. In some embodiments, an EC register of the mode register 132 may not store the exact EC count value, but may instead specify a range of the EC count value. For example, a first state of the EC register may indicate that the EC count value was below the threshold, a second state of the EC register may indicate that the EC count value was between the threshold and a second threshold, a third value may indicate the EC count value was within the range of the second threshold and a third threshold, etc.

Another example overall readout the ECS circuit 130 may generate is errors per row counter (EpRC). This readout may be generated instead of or in addition to the EC readout. As the ECS circuit proceeds, it may generate a row address, and then cycle through column addresses for that row, with each column address specifying one of a number of codewords along the row. The ECS circuit 130 may have an EpRC counter which tracks the maximum number of codewords with errors which are located on a single row address as well as the row address of the row with the maximum number of errors. Once the sequence of addresses is completed, the ECS circuit 130 may write the number of errors and the row address to the ECS register of the mode register 132 if the EpRC count is greater than a threshold filter. The threshold filter for the EpRC register may be different than the threshold filter for the EC register. In some embodiments, the filters may be settings of the memory. The EpRC count may be distinct from the per-row ECS information, in that the EpRC may only reflect the count of errors for a single row which has the most codeword errors, while the per-row ECS information tracks the number of detected codeword errors on every row of the memory array 118.

The overall ECS readouts, such as the EpRC and ECS counts, may be enabled separately from the pRECS information. For example, the mode register may include an overall ECS enable register which enables the memory to record overall ECS information and a pRECS enable register which allows the The device 100 may also receive commands causing it to carry out one or more refresh operations as part of a self-refresh mode. In some embodiments, the self-refresh mode command may be externally issued to the memory device 100. In some embodiments, the self-refresh mode command may be periodically generated by a component of the device. In some embodiments, when an external signal indicates a self-refresh entry command, the refresh signal AREF may also be activated. The refresh signal AREF may be a pulse signal which is activated when the command decoder 106 receives a signal which indicates entry to the self-refresh mode. The refresh signal AREF may be activated once immediately after command input, and thereafter may be cyclically activated at desired internal timing. The refresh signal AREF may be used to control the timing of refresh operations during the self-refresh mode. Thus, refresh operations may continue automatically. A self-refresh exit command may cause the automatic activation of the refresh signal AREF to stop and return to an IDLE state. The refresh signal AREF is supplied to the refresh control circuit 116. The refresh control circuit 116 supplies a refresh row address RXADD to the row decoder 108, which may refresh one or more wordlines WL indicated by the refresh row address RXADD.

The power supply terminals are supplied with power supply potentials VDD and VSS. The power supply potentials VDD and VSS are supplied to an internal voltage generator circuit 124. The internal voltage generator circuit 124 generates various internal potentials VPP, VOD, VARY, VPERI, and the like based on the power supply potentials VDD and VSS supplied to the power supply terminals. The internal potential VPP is mainly used in the row decoder 108, the internal potentials VOD and VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
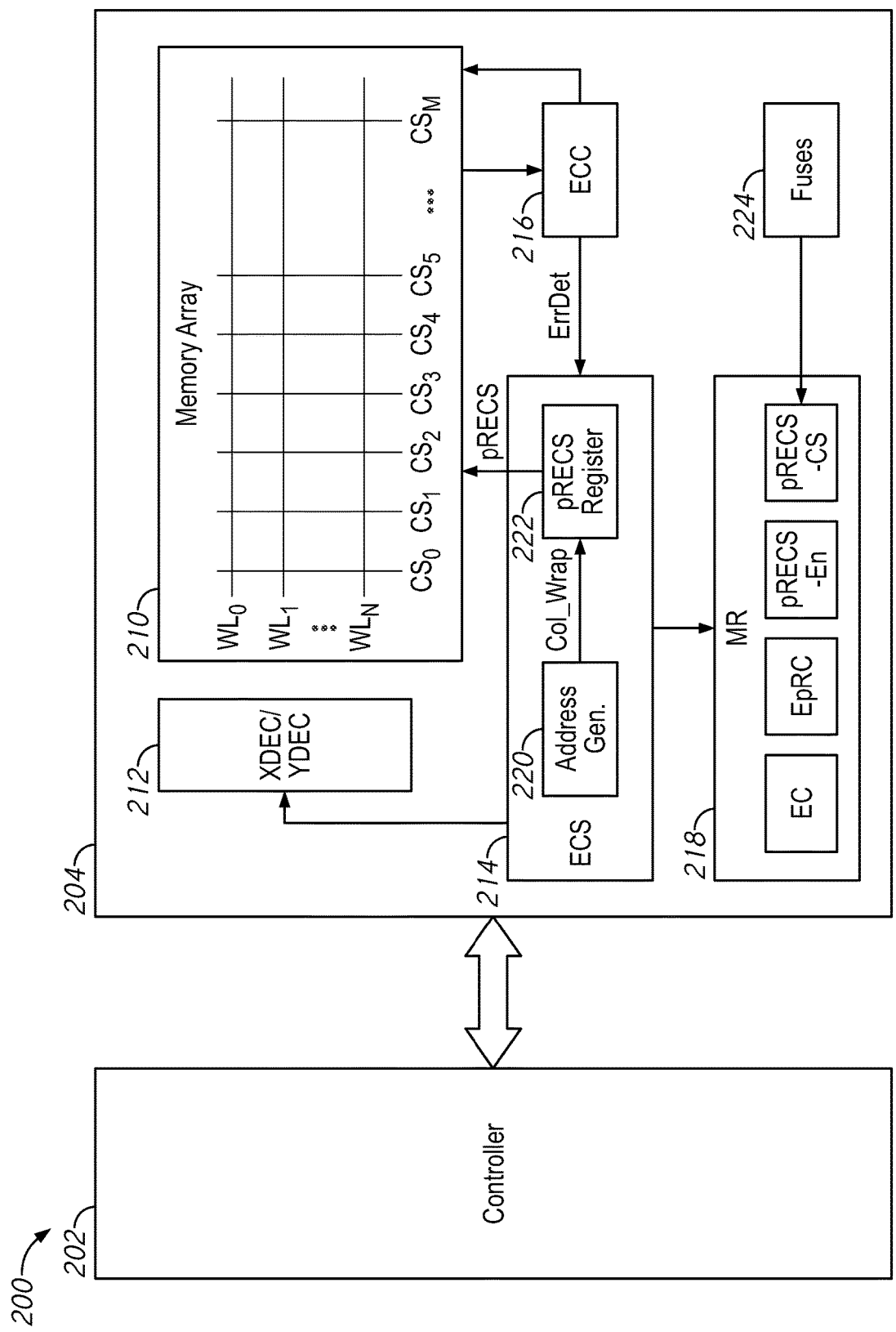
FIG. 2 is a block diagram of a memory system according to some embodiments of the present disclosure.

FIG. 2 is a block diagram of a memory system according to some embodiments of the present disclosure. The system 200 includes a controller 202 and a memory 204. The memory 204 may, in some embodiments, implement the memory device 100 of FIG. 1. The memory system 200 illustrates a memory which generates and store per-row ECS information and an example controller (optional) which may be used to retrieve the per-row ECS information.

The memory 204 includes an ECS circuit 214 which manages ECS operations. The ECS circuit 2143 includes an address generator 220 which over the course of an ECS cycle generates addresses for each code word in the memory array 210. For example, the ECS circuit 214 may provide a row and column address (an ECS address), and then update (e.g., increment) the column address, and continue until all column addresses along the row have been provided (e.g., the column address wraps back to an initial value), the ECS circuit 214 may then update (e.g., increment) the row address and repeat the process. The ECS circuit may continue generating ECS addresses until addresses associated with all codewords have been provided over the course of an ECS cycle. The current ECS address may be provided to row and column decoders 212, along with commands (such as read-modify-write commands, not shown) such that for each address, the codeword associated with the current address is read out to the ECC circuit 216, corrected (if necessary), and the corrected codeword written back to the location specified by the current address. The ECS address may then be updated.

The ECC circuit 216 may provide an error detected signal ErrDet to the ECS circuit 214. The signal ErrDet may be active each time the ECC circuit 216 detects an error in the codeword read from the memory array 210 as part of an ECS operation. The ECS circuit includes one or more counters which are updated (e.g., incremented) responsive to the ErrDet signal. For example, an EC counter may be updated based on each time the ErrDet signal is active, while the EpRC counter may also take into account the current address being provided by the ECS circuit 214 in order to identify the row which includes the most errors (and how many errors were on that row). If a counter exceeds a threshold value at the end of an ECS cycle, then the ECS circuit 214 may write information based on the count value to the mode register 218. The different values tracked by the ECS circuit 214 may have different thresholds (e.g., an EC threshold and an EpRC threshold). The thresholds may be settings of the memory (e.g., fuse settings and/or mode register settings) and may be set based on customer requirements.

The ECS circuit 214 also includes a per-row ECS (pRECS) register 222. When an pRECS mode is enabled, the pRECS register 222 may change (e.g., increment) a stored count value each time the ErrDet signal is active, and reset to an initial value (e.g., 0) each time the address generator 220 indicates that a column address has wrapped back to a new value (e.g., each time a final column address along a row has been provided). For example, after the final column address has been generated, the address generator 220 may provide a column wrap signal Col_Wrap, and update the row address to a new value. Responsive to the signal Col_Wrap, the pRECS register 222 may write its current value to memory cells of the memory array 210 and reset the stored count value (e.g., to 0). For example, the count value in the pRECS register 222 may be written to memory cells along the current row (e.g., before the row address is updated responsive to Col_Wrap). In this manner, the pRECS value for each row may represent a number of codewords along that row which contained an error (e.g., a number of times ErrDet was active for each value of the row address portion of the ECS address). In some embodiments, there may be a pRECS register 222 for each bank, and each bank may separately generate row and column addresses for ECS operations.

The memory array 210 may be organized in rows and columns. Each row may be specified by a row address (e.g., XADD) which specifies a word line. For example, the address generator 220 may generate a first row address XADD, and responsive to that, the row decoder 212 may activate a first word line (e.g., WL 0) of the memory array 210. The columns along the activated row are accessed by a column address, which is decoded to activated column select signals CS. While each column select signal is shown with a single bit line, each CS signal may activate multiple individual bit lines. For example, a given CS signal may activate 8 bit lines in each of 17 column planes of the memory array, for a total of 136 active bit lines, and 136 bits (128 data bits and 8 parity bits). Accordingly, the address generator 220 may generate a row address, then as part of a first ECS operation provide a first column select signal, then as part of a second ECS operation provide a second column select signal and so forth.

In some embodiments, the per-row ECS information may be saved in the memory array 210. In some embodiments, the per-row ECS information may be saved in memory cells along the row which the per-row ECS information is associated with. For example, one or more values of the column select signal (and their corresponding memory cells) may be set aside for storing per-row ECS information. The mode register 218 may be used to designate a value pRECS-CS, a value of the CS signal set aside for per-row ECS information. When the address generator 220 is generating ECS addresses, the address in pRECS-CS may be skipped, since it does not contain a codeword with correctable data. For example, if pRECS-CS designates a column select value $CS_M$, then the address generator 220 may set a row address and provide column addresses $CS_0$ to $CS_{M-1}$, but not provide $CS_M$. The address generator 220 may then provide the signal Col_Wrap when the column address is updated as it may return to a value of $CS_0$. Responsive to the signal Col_Wrap, the ECS logic 214 may provide the value of the pRECS register 222 as data along with the row address and the column address which activates the value in the pRECS-CS (e.g., $CS_M$) and a write command to write the value in the pRECS register 222 to the memory cells accessed by the value in the pRECS-CS register. The value pRECS-CS may be stored in a fuse array 224 of the memory 204 and may be loaded in the mode register 218 from the fuse array 224.

The mode register 218 may store various values which are related to the ECS operation. For example, the present disclosure describes an EC register and an EpRC register, although different, more, or fewer registers are possible in other examples. Each register may store various values associated with a respective counter in the ECS circuit 214. For example, the EC register may represent a number of codewords with errors which were detected in the previous ECS cycle. The EC register may represent a raw count value, or may represent a range in which the count value falls. For example, a first value of the EC register may represent that the count is below the threshold, a second value of the EC register may represent that the count is between the threshold and a first count value, a third value of the EC register may represent that the count is between the first count value and a second count value etc. The EpRC register may store both a count value and a row address associated with the row which contained the most codeword errors.

The controller 202 may retrieve the per-row ECS information by performing a read operation on the memory cells used to store the per-row ECS information. For example, the controller 202 may retrieve the address stored in pRECS-CS and then perform a read operation on those memory cells along a row to retrieve that row's per-row ECS information.

In some embodiments, the collection of pRECS information may be a selectable feature. The mode register may include a pRECS enable register pRECS-En. When the pRECS-En register is active, a pRECS mode is enabled, and the ECS logic 214 may update the pRECS register 222. When the pRECS-En register is inactive, the pRECS mode is disabled, and the register 222 may not be updated (although other ECS information such as EC and EpRC may still be collected).

Figure 3:
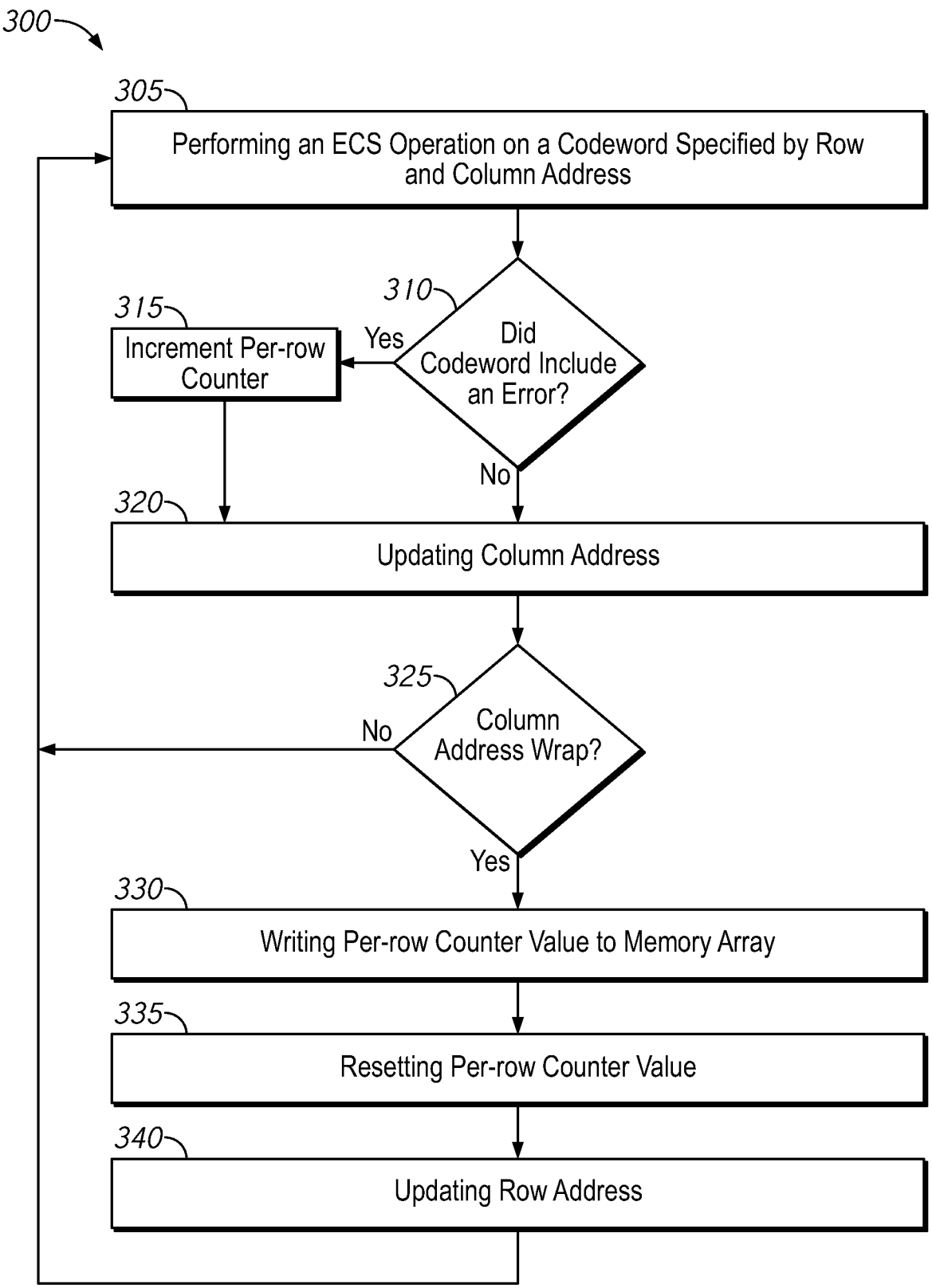
FIG. 3 is a flow chart of a method according to some embodiments of the present disclosure.

FIG. 3 is a flow chart of a method according to some embodiments of the present disclosure. The method 300 may, in some embodiments, be implemented by one or more of the systems or apparatuses described herein, such as the memory 100 of FIG. 1 and/or 204 of FIG. 2. The method 300 may represent a process which is carried out as part of an ECS cycle.

The method 300 includes box 305, which describes performing an ECS operation on a codeword specified by a row and column address. For example, an ECS logic circuit (e.g., 214 of FIG. 2) may provide the row and column address to respective row and column decoders (e.g., 212 of FIG. 2) along with command signals which indicate an ECS operation, such as a read-modify-write command. The method 300 includes reading the codeword from the memory cells specified by the row and column address to an ECC circuit (e.g., 216 of FIG. 2). The method 300 includes determining if the codeword includes errors, correcting those errors, and then writing the corrected codeword back to the memory cells specified by the row and column address.

The method 300 includes box 310, which describes determining if the codeword included an error. For example, the ECC circuit may activate an error detected signal (e.g., ErrDet of FIG. 2) to indicate that the codeword read in box 305 included an error (e.g., before that error was corrected and the corrected codeword written back). If the codeword included an error (e.g., if ErrDet is active), then the method 300 may proceed to box 315, which describes incrementing a per-row counter. In some embodiments, there may be a per-row counter for each bank of the memory, and the method 300 may also include specifying memory cells with a bank address. In such embodiments, the box 315 may include determining which per-row ECS counter to increment based on the bank address. After box 315 the method 300 may proceed to box 320. If during box 310 it is determined that the codeword did not contain an error, than the method may proceed to box 320 without incrementing the per-row counter.

Box 320 describes updating a column address. For example, the column address may be incremented to generate a new column address. Box 320 may be followed by box 325, which describes determining if the update caused the column address to 'wrap'. For example, if by incrementing the column address, the value of the column address 'rolled over' to an initial value. The wrapping of the column address may indicate that a final column address was reached and that the update column address is an initial column address. The final column address may indicate a final column address along the row which specifies an addressable codeword. Some column addresses may be 'stranded' (e.g., not used for addressable memory) or otherwise skipped such that a final address may be reached without necessarily generating every possible value of the column address. If the column address did not wrap, then the method 300 may return to box 305. If the column address did wrap, then the method 300 may proceed to box 330.

Box 330 describes writing the per-row counter value to the memory array. For example, the per-row counter value may be provided to the memory array as data to be written along with a row and column address and a write command. In some embodiments, the per-row counter value may be saved on the same row that the per-row counter value refers to. For example, the row address may be the same row address as used in box 305. The column address may refer to columns which are set aside or otherwise reserved for storing the per-row counter information. For example, a mode register may specify which columns to use. The method 300 may include writing the per-row count value to overwrite a previous per-row count value (e.g., from a previous ECS cycle).

Box 330 may be followed by box 335, which describes resetting the per-row counter value. For example the per-row counter may be reset to an initial value (e.g., 0). In embodiments where there are different per-row counters for each bank, the box 335 may describe resetting the per-row count value associated with the bank where an ECS operation (e.g., box 305) was just performed.

Box 335 may generally be followed by box 340 which describes updating the row address. If the column address wrapped, then that may indicate that all codewords along a row have been tested as part of an ECS operation (e.g., as part of box 305). Accordingly, the row address may be updated so that the codewords along a new row. In some embodiments, the row address may be updated by incrementing the previous row address. After box 340, the method may generally return to box 305.

The boxes shown as part of the method 300 represents steps which happen as part of an ECS cycle, however individual ECS operations may be separated by time and location in the memory. For example, between ECS operations (e.g., between times that box 305 is performed) the memory may perform various other operations such as refresh operations, access operations, etc. Similarly, the method 300 may include performing ECS operations on different banks at different times. For example, the method 300 may include performing a first ECS operation (e.g., starting with box 305) on a first bank and if an error is detected updating a first per-row counter associated with that bank, then performing a second ECS operation on a second bank and if an error is detected updating a second per-row ECS counter before returning to perform a third ECS operation on the first bank.

Figure 4:
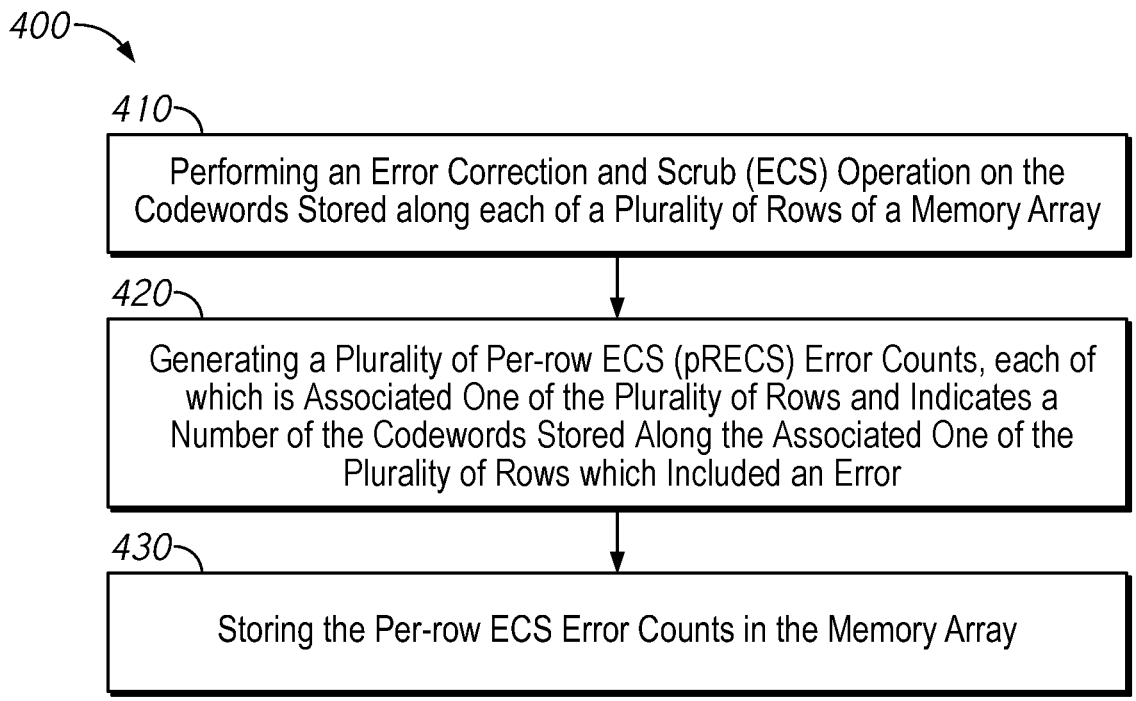
FIG. 4 is a flow chart of a method according to some embodiments of the present disclosure.

FIG. 4 is a flow chart of a method according to some embodiments of the present disclosure. The method 400 may, in some embodiments, be implemented by the memory 100 of FIG. 1 and/or 204 of FIG. 2.

The method 400 includes box 410, which describes performing an error correction and scrub (ECS) operation on the codewords stored along each of a plurality of rows of a memory array. For example, ECS logic (e.g., 214 of FIG. 2) over the course an ECS cycle may cycle through the codewords of a memory. The method may include selecting a row of the memory based on a row address (e.g., generated by an address generator 220 of FIG. 2), and then providing a sequence of column addresses to perform an ECS operation on each of the codewords along that row. The method 400 may include updating the row address once the column address wraps.

The method 400 includes box 420, which describes generating a plurality of per-row ECS error counts, wherein each per-row ECS error count is associated one of the plurality of rows and indicates a number of the codewords stored along the associated one of the plurality of rows which included an error. For example the method 400 may include performing the ECS operation on a selected one of the codewords specified by a row address and a column address, incrementing a per-row ECS count register if the selected one of the codewords included an error, updating the column address, determining if the column address has wrapped, and updating the row address if the column address has wrapped. The method 400 may include writing a value of the per-row ECS count register to the memory array as one of the per-row ECS error counts if the column address has wrapped, and resetting the per-row ECS count register if the column address has wrapped.

The method 400 includes box 430, which describes storing the per-row ECS error counts in the memory array. For example, the method 400 may include storing each of the per-row ECS error counts in memory cells of the associated one of the plurality of rows.

Figure 5:
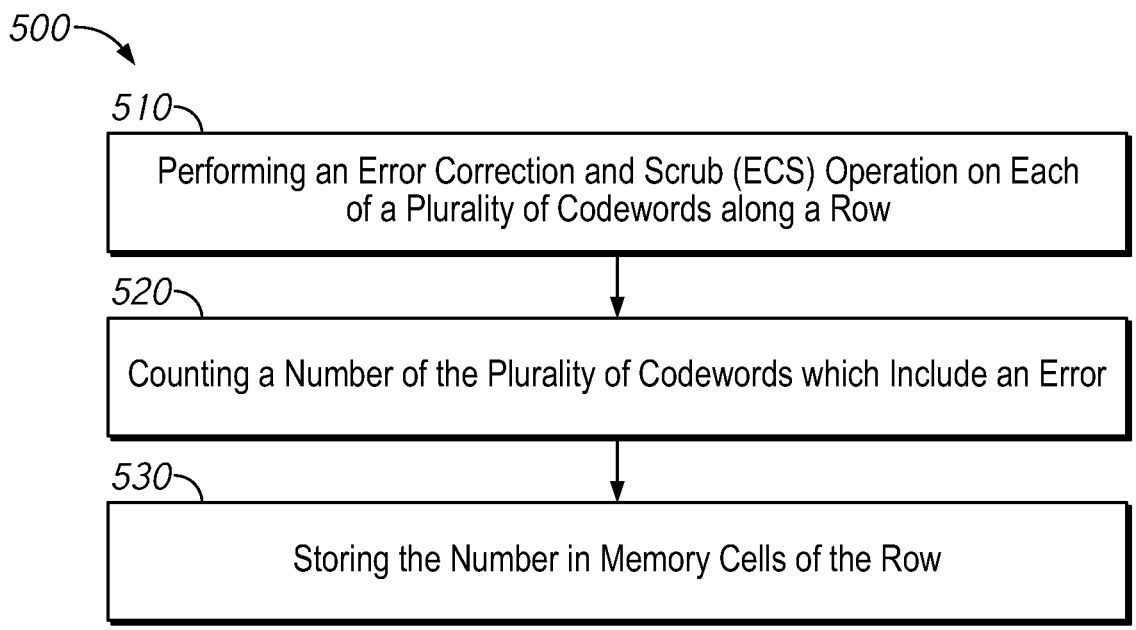
FIG. 5 is a flow chart of a method according to some embodiments of the present disclosure.

FIG. 5 is a flow chart of a method according to some embodiments of the present disclosure. The method 500 may, in some embodiments, be implemented by the memory 100 of FIG. 1 and/or 204 of FIG. 2.

The method 500 includes box 510, which describes performing an error correction and scrub (ECS) operation on each of a plurality of codewords along a row. For example, ECS logic (e.g., 214 of FIG. 2) may provide an ECS address which includes a row address which specifies the row and a sequence of column addresses, each associated with one of the plurality if codewords. The method 500 may include ECS operations which include determining if the codeword includes an error, correcting the error, and writing the corrected codeword bank to the row.

The method 500 includes box 520, which describes counting a number of the plurality of codewords which include an error and box 530, which describes storing the number in memory cells of the row. For example the method 500 may include incrementing a per-row ECS register in an ECS circuit each time the ECS operation detects an error, and writing a value of the per-row ECS register to the memory cells when an ECS operation is performed on a final one of the plurality of codewords.

The method 500 may include performing an ECS operation on each of a second plurality of codewords along a second row, counting a second number of the second plurality of codewords which include an error, and storing the second number in memory cells of the second row.

In some embodiments, the pRECS information may be stored in memory cells which are 'stranded', not otherwise used to store information provided by the controller. For example, some memories may store data as well as metadata associated with that data. As part of an example write operation, a controller (e.g., 202 of FIG. 2) may provide the data and its associated metadata to the memory (e.g., 204 of FIG. 2) along with row, column, and bank addresses for where to store the data. The memory may set aside some columns along each row for data, and some columns for metadata. The metadata columns may not be directly accessible by the controller. Instead, the memory may use internal mapping to determine where to store the metadata based on which columns are being used to store the data. However, in some implementations, the total number of columns (e.g., the total number of memory cells) along a row may not divide evenly between columns for data storage and columns reserved for metadata. In other words, some column addresses (e.g., a first portion of the memory cells along the row) may be used for data storage, some columns (e.g., a second portion of the memory cells along the row) may be used for metadata, and some columns (e.g., a third portion of the memory cells along the row) may be 'stranded', neither used for data nor metadata. In such an embodiment, the memory may use the stranded columns to store the pRECS information. The pRECS address register (e.g., pRECS-CS of FIG. 2) may designate which columns are stranded, and may be based on the memory's mapping of data and metadata column addresses.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a memory array comprising:
   a plurality of rows configured to store a plurality of codewords; and
   a plurality of count values, each associated with one of the plurality of rows; and
   an error correction and scrub (ECS) circuit comprising a count register configured to track a number of errors along a current row of the plurality of rows, wherein the ECS circuit is configured to increment a value stored in the count register of the ECS responsive to detecting an error, and to update an associated one of the plurality of count values in the memory array with the value stored in the count register, and wherein the ECS circuit is configured to store overall ECS information in a mode register.

2. The apparatus of claim 1, wherein the ECS circuit is further configured to:
   generate a column address;
   perform an ECS operation on one of the plurality of codewords specified by the column address;
   store the value in the count register as one of the count values in memory array if the column address wraps; and
   reset the count register to an initial value.

3. The apparatus of claim 1, wherein the overall ECS information represents a total number of errors in the memory array.

4. The apparatus of claim 1, wherein the overall ECS information represents a maximum number of codewords with errors which are located on a row address and the row address.

5. The apparatus of claim 1, wherein the mode register is configured to designate a value of a column select signal set aside for per-row ECS information.

6. The apparatus of claim 1, further comprising:
   an error correction circuit (ECC) configured to read a selected one of the plurality of codewords, determined if the selected one of the plurality of codewords includes an error, correct the error and write the corrected codeword back to the row.

7. The apparatus of claim 1, wherein the mode register includes an enable register configured to activate the ECS circuit.

8. A method comprising:
   performing an error correction and scrub (ECS) operation on codewords stored along each of a plurality of rows of a memory array;
   incrementing a per-row ECS count register if a selected one of the codewords included an error;
   generating a plurality of per-row ECS error counts, wherein each per-row ECS error count is associated with one of the plurality of rows and indicates a number of the codewords stored along the associated one of the plurality of rows which included an error;
   writing a value of the per-row ECS count register to the memory array as one of the per-row ECS error counts; and
   storing the per-row ECS error counts in the associated row in the memory array specified by a mode register.

9. The method of claim 8, further comprising:
   designating a value of a column select signal set aside for the per-row ECS error counts.

10. The method of claim 8, further comprising storing each of the per-row ECS error counts in memory cells of the associated one of the plurality of rows.

11. The method of claim 10, further comprising:
    storing a row address associated with the row which contains the most codeword errors.

12. The method of claim 8, further comprising:
    performing the ECS operation on the selected one of the codewords specified by a row address and a column address;
    updating the column address;
    determining if the column address has wrapped; and
    updating the row address if the column address has wrapped.

13. The method of claim 12, further comprising:
    writing the value of the per-row ECS count register to the memory array as one of the per-row ECS error counts if the column address wrapped; and
    resetting the per-row ECS count register if the column address has wrapped.

14. The method of claim 8, further comprising:
    comparing the per-row ECS error counts to a saved number in an errors per row count (EpRC) register;
    saving a row address associated with the row if the number is greater than the saved number; and
    replacing the saved number with the number if the number is greater than the saved number.

15. The method of claim 8, further comprising:
    storing overall ECS information in the mode register.

16. A method comprising:
- performing an error correction and scrub (ECS) operation on each of a plurality of codewords along a row of a memory array;
- determining if the codeword includes an error;
- counting a number of the plurality of codewords which include an error;
- incrementing a count value stored in a count register each time a codeword with an error is detected;
- storing the number in memory cells of the row;
- generating overall ECS information; and
- storing the overall ECS information in a mode register.

17. The method of claim 16, further comprising
- responsive to the codeword including an error, correcting the error; and
- writing the corrected codeword to the row.

18. The method of claim 16, further comprising:
- performing the ECS operation on each of a second plurality of codewords along a second row of the memory array;
- counting a second number of e second plurality of codewords which include an error; and
- storing the second number in memory cells of the second row.

19. The method of claim 18, further comprising:
- storing a third number representing the count value to the mode register if the count value exceeds a threshold when all addresses in the sequence are complete.

20. The method of claim 19, wherein the third number specifies a range of the count value relative to the threshold.

* * * * *